Feb. 2, 1965  G. J. LACHANCE  3,168,327
FOLDING SEAT CONSTRUCTION FOR NESTING GROCERY CARTS
Filed Nov. 5, 1962
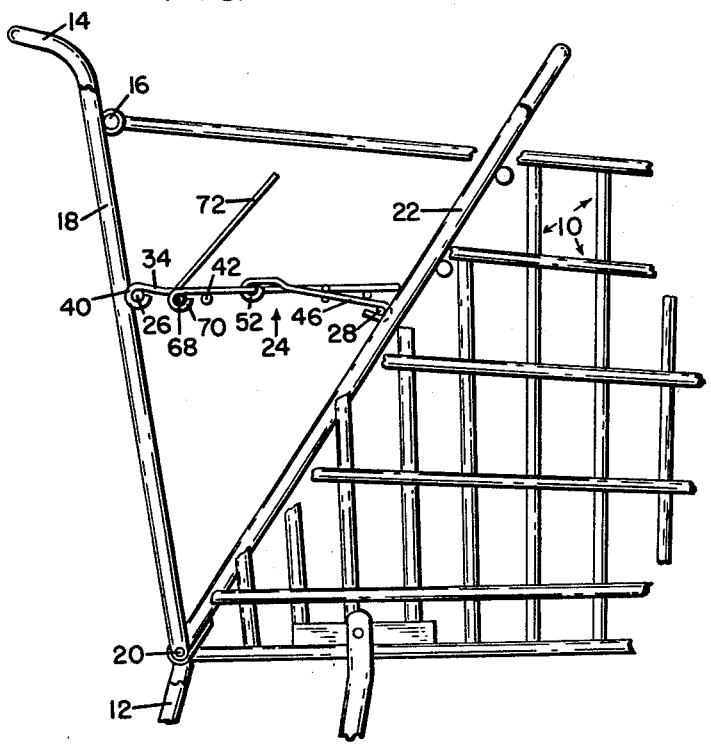
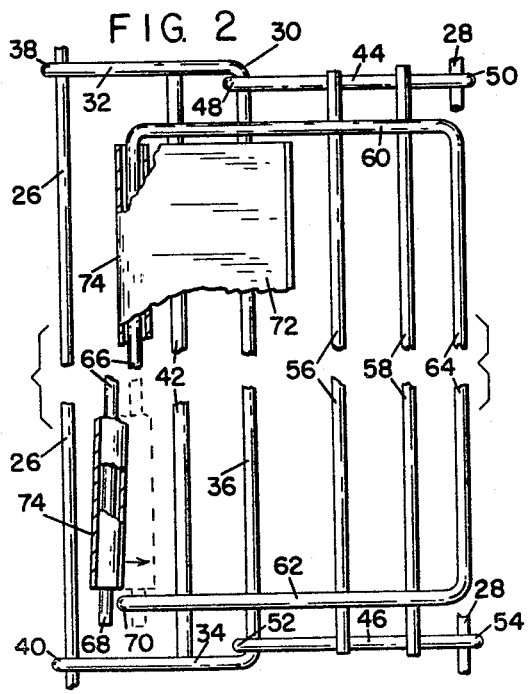
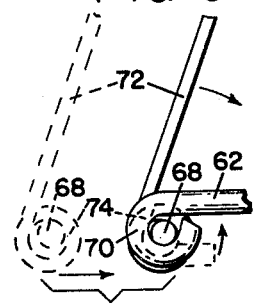
INVENTOR
GERALD J. LACHANCE
by Charles R. Fay,
ATTORNEY 3,168,327
FOLDING SEAT CONSTRUCTION FOR NESTING
GROCERY CARTS
Gerald J. Lachance, North Brookfield, Mass., assignor to Armand A. Lachance, Auburn, Mass.
Filed Nov. 5, 1962, Ser. No. 235,281
6 Claims. (Cl. 280—33.99)

This invention relates to a new and improved folding seat construction for nesting grocery carts, and more particularly to a new and improved method and apparatus for assembling the same including a sheet-like seat member which is adapted to fold down to form a seat covering the wire members of a knuckle-type of folding seat support between the usual swinging gate and the usual pivoted wall mounted on the gate. The cart construction otherwise may be as desired according to conventional carts well known in the art.

The novel construction herein presents an improvement over United States Patent No. 2,952,470, and the principal object of the present invention resides in the provision of a seat construction which is easier and quicker to make and assemble and which is less expensive than those of the prior art, and the provision of a plain solid seat member having a rolled-over edge forming a substantially cylindrical tube for quick and easy sliding assembly thereof onto a seat-supporting member, said supporting member including a single wire in the form of a rectangle having at one corner an interconnection between a short side and a long side, the long side originally having an end free of this connection so as to slidably receive the tubular edge member of the solid seat member thereon, the solid seat member being slightly shorter than the single wire rectangle so that the interconnection can then be secured quickly and easily as by forcing the free end past a hook forming the terminal portion of the adjacent short side of the wire rectangular member, after which said hook can be closed to permanently contain and restrain the free end of said wire member, thus permanently connecting the parts together in an extremely simple and inexpensive manner.

The invention further relates to arrangements and combinations of parts which will be hereinafter described and more particularly set forth in the appended claims.

Reference is to be had to the accompanying drawings, in which

FIG. 1 is a view in side elevation illustrating the invention, parts being broken away;

FIG. 2 is a plan view showing the seat construction per se, parts being broken away and in section, and FIG. 3 is a diagrammatic view illustrating the connection of certain seat parts.

Referring now to FIG. 1, there is shown the rear portion of a nesting grocery cart which has a basket 10 mounted on a frame 12. The basket and frame can be of any desired construction. The frame includes side members rising upwardly as is well known in the art terminating in a handle 14, this handle being of course rigidly connected with respect to the frame. The basket has a top, fixed cross wire 16 and on this cross wire there is swingingly mounted a rear gate 18 well known in the art. This rear gate has a cross wire member 20 at the lower portion thereof on which a swinging wall member 22 is hingedly mounted. Between the gate 18 and the wall member 22 there is a seat construction which is generally indicated by the reference numeral 24.

When the carts are to be nested, a following cart impinges upon the gate 18 swinging it up and this folds the seat, bringing the wall 22 to an overlying position with relation to the gate 18, the parts now being horizontal or substantially so and extending to the right in FIG. 1 from the wire 16 so that the basket of the succeeding cart can enter and nest with the basket 10.

The gate 18 intermediate the cross wires 16 and 20 is provided with another cross wire 26 which may be welded or otherwise secured thereto, and the pivoting wall 22 has a similar cross wire at 28, cross wire 28 being slightly below the one at 26 as viewed in FIG. 1. It is on these two cross wires that the unit to be described is mounted to form the seat for an infant while the rest of the basket is utilized for the reception of groceries or other goods.

The seat unit comprises a U-shaped wire 30 including two short spaced arms 32 and 34 and a longer reach 36 between the two arms. The free ends of the arms 32 and 34 are provided with hooks 38 and 40 which are originally open so as to be hooked over the cross wire 26 when the entire unit is to be assembled to the gate.

There is also a wire 42 which may be welded or otherwise secured to the under side of the short arms 32 and 34, this wire being parallel to the reach 36 described above.

Adjacent the ends of reach 36, i.e., adjacent the short arms 32 and 34 respectively thereof, there are two short members which are indicated at 44 and 46, these members having at the ends thereof hooks at 48, 50, 52 and 54. Hooks 48 and 52 are hooked over the wire 36 adjacent the ends thereof in permanently mounted condition with respect thereto and at the other ends the hooks 50 and 54 are originally open to be quickly and easily applied to the cross wire 28 in the same manner that hooks 38 and 40 are applied to the gate. These hooks are then adapted to be quickly and easily closed to permanently secure the entire seat construction to and between the cross wires 26 and 28. Two wires 56 and 58 are welded or otherwise secured to the top portion of the short members 44 and 46.

It will be seen that there are two frames, one of which has the main members 32, 34 and 36, and in the other of which the main members are 44, 46, 56 and 58, these frames being hingedly mounted about the reach 36 as an axis.

Welded or otherwise secured to the two members 42 and 36 are two ends 60 and 62 forming parts of a single wire rectangular frame. These ends are free of the members 56 and 58 and have an integral reach 64 connecting them and another reach 66 having a free end and being connected to end 60 permanently. It will be noted that the end 68 of reach 66 is free of the end 62, but the members 60, 62, 64 and 66 are preferably all one single bent wire. Free end 68 is adapted to snap in under the hook 70 on the free end of the short arm 62, per the diagram (FIG. 3).

The solid seat member is indicated at 72 and it is preferably made of plastic or metal and has a rolled-over edge 74 which clearly is easily slid onto the wire reach 66 from the free end 68 thereof to assume the position shown in FIG. 2, whereupon it is merely necessary to move the free end 68 with its assembled seat member 72 from the dotted line position shown in FIG. 2 to the solid line position thereof, where it snaps into the hook 70. Then the open end of hook 70 is bent up to solid line position in FIGS. 3 and 1 permanently securing the parts together.

It will be seen that the seat member 72 then is free to pivot upon the wire 66 as an axis and can be used in the usual way well known in the art for covering the wires making up the seat support so that the infant will have a comfortable seat. At the same time the seat 72, in the absence of an infant on the seat, is free to swing up to a position overlying the gate 18 to close the leg holes which are not shown but which are ordinarily found in the usual swinging gate.

Having thus described my invention and the advantages thereof, I do not wish to be limited to the details herein disclosed, otherwise than as set forth in the claims, but what I claim is:

1. Seat construction for a grocery cart including a frame, a basket on the frame, said basket including a rear gate swingingly mounted at its top end, and a pivoted wall swingingly mounted to the lower end of said gate so that the upper ends of the gate and the wall may be moved to and away from each other, said seat construction comprising a pair of seat-supporting wire frames, one of said frames being pivotally connected to said gate and the other being pivotally connected to said wall, said frames being located intermediate the ends of said gate and wall respectively, means interpivoting said wire frames intermediate the swinging gate and the swinging wall so that the two wire frames are connected and may be folded into general parallelism with each other and with the gate and the wall respectively when the upper ends of the gate and the wall are moved together, said wire frames also having an extended seat forming position wherein they are in substantial alignment, and means holding the wire frames in said seat forming position, one of said wire frames including a single wire member in the form of a rectangle but having a free end, the free end being located adjacent the opposite end of the single wire, said opposite end being in the form of a hook having an open bight, and said wire being somewhat springy, the free end of the wire tending to be normally positioned spaced from said hook at the opposite side from the bight thereof, the resilience of the wire tending to maintain the free end in said spaced position, the free end of the single wire being capable of being moved against its inherent resiliency past the hook and into the bight to be located and held therein closing said single wire rectangular member, and a seat, said seat comprising a solid member having a tubular element at an edge thereof, said tubular element having open ends and being mounted on and slidable over the free end of said single wire, so that when the free end of the latter is moved as aforesaid against the inherent resiliency of said single wire member into the bight of the hook, said tubular member and therefore the seat to which it is attached are held thereby in swinging relation on the single wire member, said seat selectively overlying the seat supporting frames and being movable to a generally vertical position lying against a part of the gate.

2. The seat construction as recited in claim 1 including means for permanently and substantially holding the free end of said single wire in the hook.

3. The seat construction as recited in claim 1 including means for permanently and substantially holding the free end of said single wire in the hook, said last-named means including an eye formed of said hook and having a restriction preventing exit of said free end from the eye.

4. The seat construction of claim 1 wherein the free end of said rectangular single wire frame member is located adjacent the swinging gate.

5. The seat construction of claim 1 wherein the free end of said rectangular single wire frame member is located adjacent the swinging gate, and said single wire rectangular frame member extending past the hinging axis of said two wire frame members and overlapping the wire frame member which is attached to the swinging wall, thereby forming a portion of the means holding the wire frames in seat forming position.

6. The seat construction of claim 1 wherein the free end of said rectangular single wire frame member is located adjacent the swinging gate, and said single wire rectangular frame member extending past the hinging axis of said two wire frame members and overlapping the wire frame member which is attached to the swinging wall, thereby forming a portion of the means holding the wire frames in seat forming position, said seat member substantially conforming in area to said rectangular wire frame member.

References Cited in the file of this patent

UNITED STATES PATENTS 2,952,470 Lachance et al. _____ Sept. 13, 1960

FOREIGN PATENTS 352,032 Germany _____ Apr. 20, 1922